(No Model.) 2 Sheets—Sheet 1.
C. L. BERGER.
DEEP SEA ELECTRIC CURRENT METER.
No. 575,455. Patented Jan. 19, 1897.
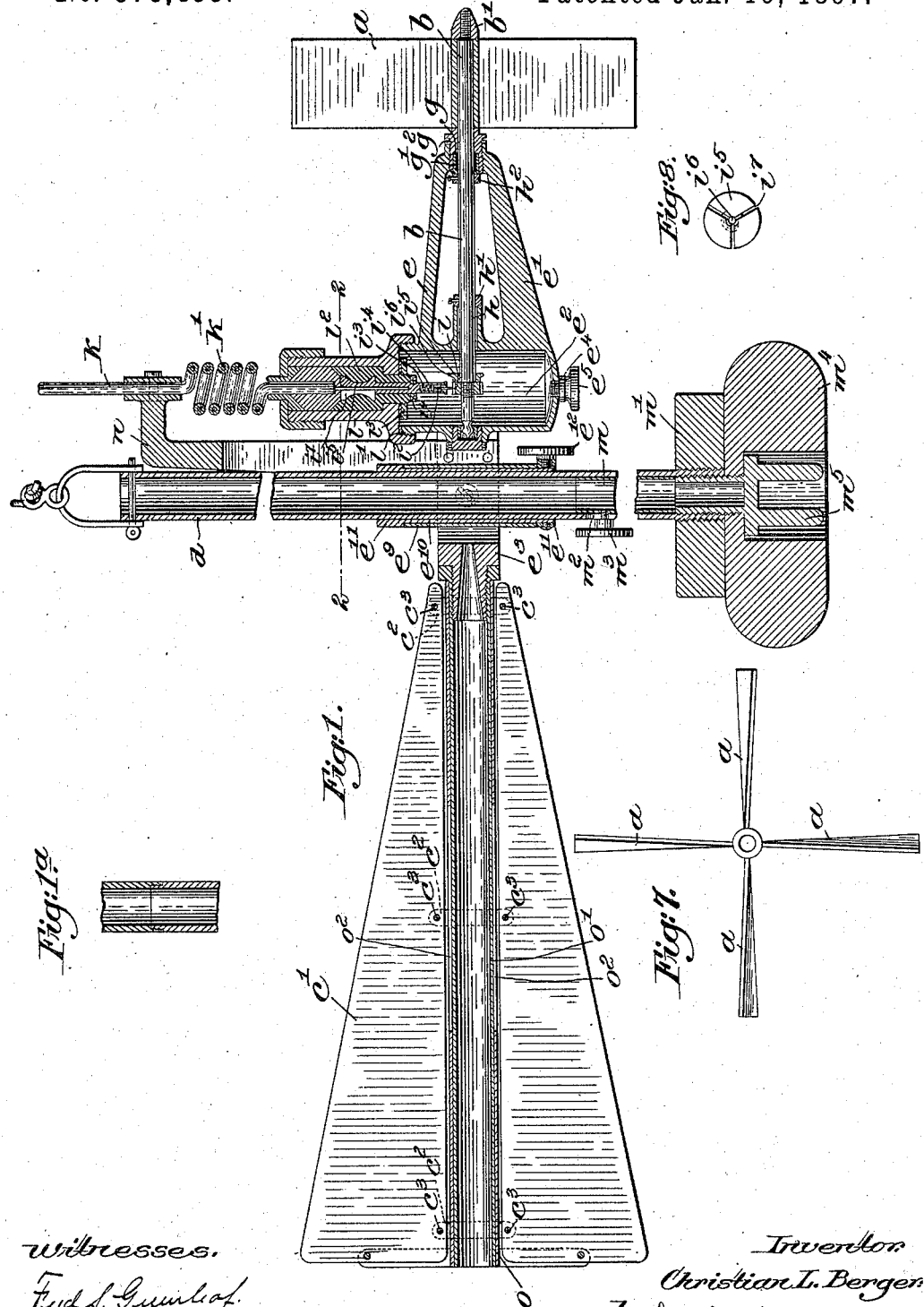

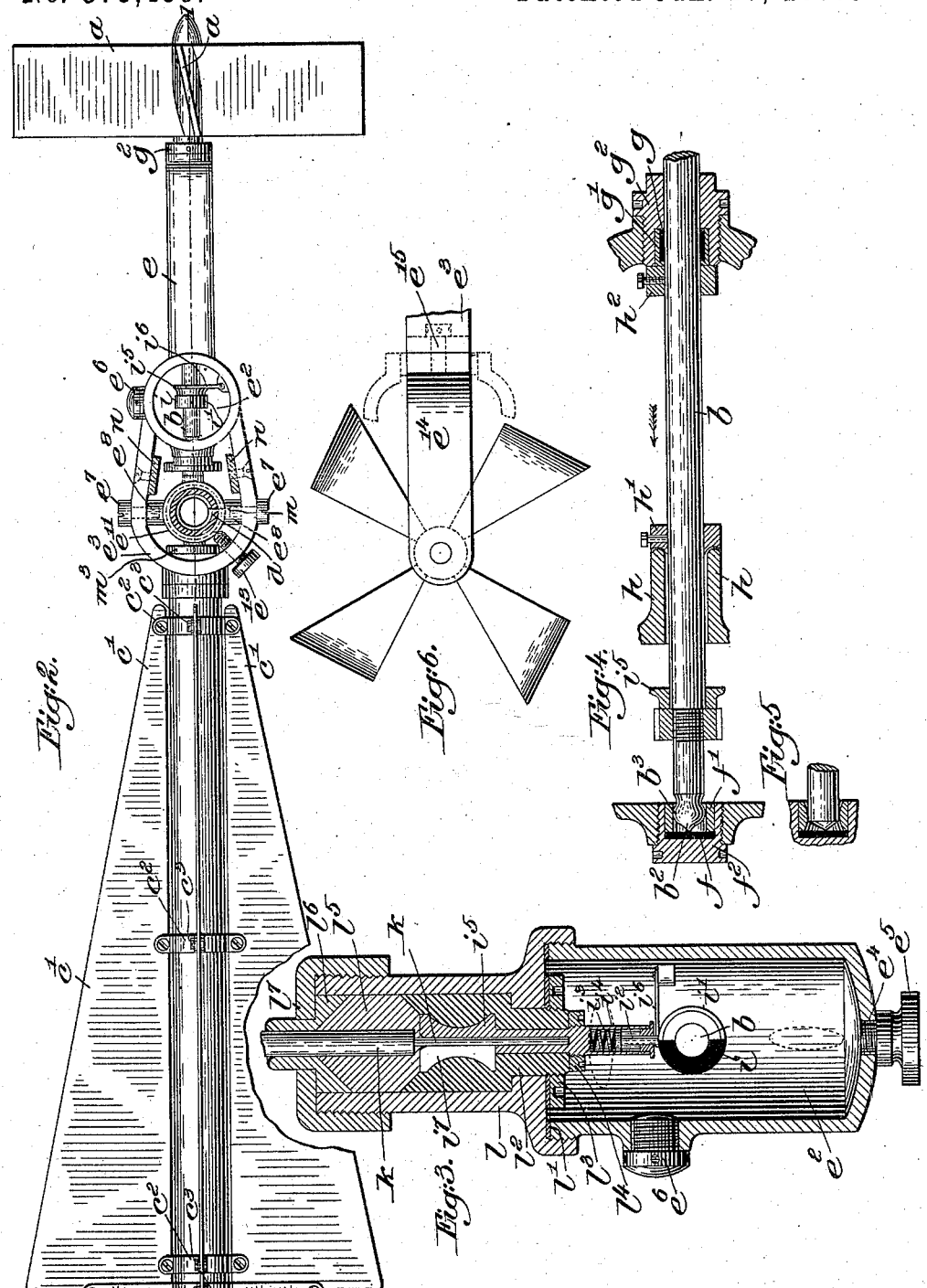

UNITED STATES PATENT OFFICE.

CHRISTIAN L. BERGER, OF BOSTON, MASSACHUSETTS.

DEEP-SEA ELECTRIC-CURRENT METER.

SPECIFICATION forming part of Letters Patent No. 575,455, dated January 19, 1897.

Application filed September 28, 1896. Serial No. 607,159. (No model.)

*To all whom it may concern:*

Be it known that I, CHRISTIAN L. BERGER, of Boston, in the county of Suffolk and State of Massachusetts, have invented an Improvement in Deep-Sea Electric-Current Meters, of which the following description, in connection with the accompanying drawings, is a specification, like letters on the drawings representing like parts.

My invention relates to improvements in current meters or devices for recording the flow of streams, tides, &c., being particularly adapted for deep-sea work.

It is the object of my invention to reduce the frictional resistance to a minimum in order to increase the accuracy and sensitiveness of the device, and hence render it more efficient and capable of a wider range of usefulness than has been hitherto practicable.

In measuring the tidal flow of the sea, which is often extremely sluggish, it is necessary for accurate work that the frictional coefficient of the meter should be as small as possible and absolutely unvarying. Otherwise the slight variations in the movements of the sea would be unrecorded, or, if recorded, the record would be unreliable. My invention provides for these requirements. It is also necessary, particularly in working at considerable depths, where the hydrostatic pressure is enormous and tends to force the water into the bearings of the meter, no matter how tight and perfect the joints may be, that the disastrous effects of this sea water in destroying the working of the electrical connections should be reduced to a minimum. Accordingly I have made provision for permitting the entrance of an unusual amount of water through the joints without the possibility of destroying the proper working of the electrical connections, the joints, however, being made as nearly absolutely water-tight as is possible, whereby the instrument may be maintained in proper active working position deep in the water for a much longer time than has hitherto been possible.

Further improvements of the present invention relate to the balancing of the meter, no matter at what depth it may be placed, and also maintaining the same in proper electrical circuit as well as in proper horizontal position, so as to prevent the making of incorrect records by reason of the tipping and swaying of the meter by reason of its connections at the surface of the water.

In the accompanying drawings, illustrative of my invention, Figure 1 is a central vertical longitudinal sectional view. Fig. 1ª is a similar section showing the extensible pendulum-rod. Fig. 2 is a horizontal sectional view taken on the line 2 2, Fig. 1. Fig. 3 is an enlarged transverse vertical section of the oil-chamber and electrical connections. Fig. 4 is an enlarged horizontal section of the bearings for the rotator-shaft, adjacent parts being broken away. Fig. 5 is a detail in corresponding section to Fig. 4, showing a modification of the end bearing. Fig. 6 is a fragmentary view in side elevation of a modified form of rotator, showing the same in reversed position in dotted lines. Fig. 7 is an end elevation of the rotator shown in Fig. 1, and Fig. 8 is a top plan view of the automatic clamp for holding the electric terminal.

As herein shown, the wheel or rotator $a$, mounted on shaft $b$ and secured by a nut $b'$, the tail or rudder $c$, and the supporting rod or cable $d$ may be of usual or preferred construction.

According to my invention the shaft $b$, carrying the rotator $a$, is journaled in a projecting bracket having at its forward end, preferably, an upper horizontally-flattened arm $e$ at its upper side and a vertically-flattened arm $e'$ at its lower side, at its middle portion an oil-well $e^2$, and at its rear portion an encircling band or stirrup $e^3$, within which is secured, by means presently to be described, the supporting cable or tube $d$. These instruments are used more or less in salt water, and the range of material which can be used for bearings is therefore exceedingly limited, inasmuch as most materials are rapidly corroded and destroyed by the action of the salt water. I have, however, invented a bearing which works perfectly in salt water, and also reduces the friction of the parts to a minimum and maintains practically the same frictional coefficient under all circumstances, at the same time resisting wear almost indefinitely. This part of my invention is shown in enlarged views in Figs. 4 and 5.

The thrust of the shaft $b$ is in the direction of the arrow, Fig. 4, the rotator being placed facing upstream.

The inner end of the shaft $b$ is preferably formed substantially as shown in Fig. 4, that is to say, it has a conical end $b^2$, rounded off slightly at its apex, and a circular or spheroidal portion $b^3$, the end $b^2$ bearing against a vertical plate $f$, of iridium, and the portion $b^3$ bearing against an annulus $f'$, preferably of iridium or of agate, the plate $f$ and annulus $f'$ being mounted in a screw-socket $f^2$, set into the wall of the well or chamber $e^2$.

Toward the outer end of shaft $b$ a hub or annulus $g$, of iridium, is secured thereon, which turns in contact with a bearing $g'$, of agate, the latter being secured in the bracket by means of a socket-nut $g^2$.

The wall of the oil-well $e^2$ is perforated opposite the inner bearing just described to loosely receive the shaft, as shown at $h$, the free end of this opening being loosely closed by a sleeve $h'$, adjustable on the shaft $b$, the meeting edges of the projection $h$ and the sleeve $h'$ being preferably let into each other, substantially as shown in Fig. 4, in order to prevent the oil from running along the shaft.

An adjustable sleeve $h^2$ is provided on the shaft $b$ adjacent the outer bearing to prevent the shaft from coming out.

Instead of the bearing, as shown in Fig. 4, for the inner end of the shaft, in which case the shaft is made spheroidal, so as to reduce the surface contact of the shaft on its bearings, the curved surface may be reversed, that is to say, the bearing may be rounded and the shaft left cylindrical, as indicated in Fig. 5.

In order to make it extremely difficult for the water to be forced through the joints into the meter adjacent the electrical make-and-break apparatus, it is customary to surround the latter with oil, so that before the water can enter the oil has to be displaced. In practice, however, it has been found that this displacement of the oil takes place quite rapidly and that the electrical apparatus becomes surrounded by water in a very short time, thereby requiring that the apparatus should be raised to the surface and the sea water removed and a fresh supply of oil introduced in order that proper electrical circuits may be thereafter made. According to my invention, however, (see particularly Fig. 3,) $i$ represents an insulated portion, as of ivory, partially surrounding the shaft $b$, and $i'$ a metal portion, as of platina. Bearing on the upper side of this make-and-break ring formed by the parts $i\ i'$ is a contact-plunger $i^2$, held in constant contact with the ring by means of a delicate, preferably gold, spring $i^3$, the spring and plunger being loosely supported within a cage or open tube $i^4$, carried at the lower end of a clamp $i^5$ of metal, preferably hard brass. This clamp is shown in detail in Fig. 8, being provided with a central aperture $i^6$ and a plurality of slits $i^7$, three being herein shown, so that as the electric wire $k$ is forced into the opening $i^6$ the fingers of the clamp will yield sufficiently to permit the entrance of the wire and yet will spring against the same with a grasp sufficient to prevent the accidental withdrawal of the wire.

The clamp $i^5$ and terminal apparatus just described are mounted in a cap-piece $l$, screw-threaded at its lower end to fit snugly on the upper end of the oil-well $e^2$, a suitable washer $l'$ being provided, and the clamp is surrounded, preferably, by an insulating-plug $l^2$, of hard rubber, fitted in place and retained in proper position by means of nuts $l^3\ l^4$, a suitable gland being provided at the upper end of the cap-piece and plug, herein shown as comprising a packing $l^5$, of soft rubber, a brass plug or follower $l^6$, and a cap-nut $l^7$, by means of which the gland may be tightened.

It will be noted that by the construction above explained all the electrical parts are carried in the upper portion of the oil-well $e^2$, and also that the shaft $b$ is mounted in the latter as near the upper portion thereof as is feasible, my object being to provide an enlarged lower portion of the oil-well to receive such salt water as may leak through the joints. The water of course will seek the lowest part of the oil-well, supporting the oil upon its surface, so that by my construction it will be possible for the apparatus to work perfectly, even though a considerable amount of water should be carried thereby, inasmuch as the electric current will not be diverted by the water until the latter reaches the make-and-break part of the apparatus.

An outlet $e^4$ is provided at the lower end of the oil-well, closed by a stop-screw $e^5$, for permitting the water to be removed, and a sight-opening and screw-stop $e^6$ are provided at the upper end for readily inspecting the more delicate part of the apparatus and also for filling the oil-well with oil when desired.

Under the strain of complex currents and other influences combined, such as swaying of the water, &c., it is found practically impossible to maintain the shaft of the rotator in absolutely uniform position, but the shaft will invariably wabble more or less at times, thereby producing in instruments now in use certain erratic breaks in the electrical circuit, each of these breaks of course making a record in the recording instruments at the surface of the water, and thereby rendering the said record inaccurate and unreliable. In order to counteract this defect, I have provided a metallic extension $i^{15}$ (see Fig. 4) from the make-and-break ring, a spring-arm $i^{16}$, Fig. 3, preferably of gold, being in constant contact with this extension. The result is that whatever wabbling or swaying of the rotator-shaft may take place can have no effect on this portion of the electrical circuit, but the make and break will be made entirely by the parts $i\ i'$. False recording has also been found to have been caused by the swaying and tipping of the instrument, that is to say, when the rotator might turn the make-and-break circle into substantially the position shown in Fig. 3 a sudden lurch sidewise of the instrument would cause a forward and then a backward movement of the rotator, so as to move the line of separation between the ivory and platina twice and three times beneath the terminal $i^2$, and hence make a corresponding number of records at the surface, notwithstanding the fact that the rotator had not turned around even once.

Viewing Fig. 1, it will be seen that I have provided a pendulum extension (herein shown as on the end of the tube $d$) for the purpose of preventing any sudden lurching movement of the instrument and so as to maintain the same perfectly steady. This pendulum, on which the instrument can be clamped at any height, consists, as shown, of a tube $m$ about three feet long, carrying a weight $m'$, of lead or other heavy material, at its lower end and preferably telescopically arranged with reference to the supporting-tube, supported by a rope or cable and connected therewith by a ring and link, as shown, the tube being herein shown as provided with a slot $m^2$ to permit the movement therein of a set-screw $m^3$, or it may be made in sections screwed together, as shown in Fig. 1$^a$. For extreme depths, swift currents, and agitated waters I provide an additional weight $m^4$, removably secured to the pendulum by means of a hand-nut $m^5$ to afford extra steadiness to the meter. I regard this pendulum feature of my invention as of very great importance, inasmuch as it quite materially aids in effectually preventing the making of any erratic records, which have hitherto proved to be a serious drawback to these instruments.

A bracket $n$ extends upward, as shown in Fig. 1, to receive and clamp a terminal wire $k$ at a point above its end in order that the swaying of the wire and any other disturbance of the same may not interfere in the slightest with the proper working of the instrument, the wire being preferably coiled, as at $k'$, in order still further to reduce the possibility of any such interference.

I have herein shown the rudder as extensible for the purpose of affording means for balancing the instrument, and when in use to lengthen said rudder for low velocities, the rudder extending in the direction of the current to maintain the instrument in the same direction. To this end the vanes of the rudder are clamped on an exterior tube $o$, which is fitted snugly on an inner tube $o'$, the latter being fixedly secured to the stirrup $e^3$.

When it is desired to extend the rudder, the clamps are slightly loosened and the rudder is slid along the inner tube $o'$ to the desired distance, when the clamps are tightened, the outer tube being split, as at $o^2$, for the purpose of permitting the same to be compressed about the inner tube.

Under certain circumstances it is not necessary to have the horizontal plates $c'$, as shown in Fig. 2, and accordingly I have made these removable by means of the brackets $c^2$ and screws $c^3$.

In order that the instrument may not be controlled by the supporting-rod, particularly in case the latter should be a gas-pipe, in which instance if the water should be rough, so that the boat or other upper connection for the said supporting-rod would sway and rock, the instrument would inevitably be agitated more or less, I have mounted the instrument on the support by means of opposite horizontal pivots $e^7$.

The pivot-bearings $e^7$ enter the sockets $e^8$ at either side of a sleeve $e^9$, Fig. 1, freely rotatable on an inner sleeve or thimble $e^{10}$, the latter being provided with flanges $e^{11}$ at top and bottom and clamped by means of a set-screw $e^{12}$ to the support $d$.

It will be noted that this construction permits the supporting-rod $d$ to move relatively to the instrument both longitudinally and axially and back and forth. A set-screw $e^{13}$, Fig. 2, is provided to clamp the parts together when desired.

Viewing Fig. 6, it will be seen that I have made a provision for turning the rotator from one position to another, this feature being particularly desirable in case a rotator of the pattern employed by General Ellis, constructed on the anemometer principle, should be used, as shown in Fig. 6, the rotator being there shown in a vertical position in full lines and its supporting-arms being shown turned at right angles thereto in dotted lines for the purpose of moving the rotator horizontally, the arms $e^{14}$ being adjustable on the pivot $e^{15}$.

In use the sinker-rod or pendulum is adjusted to the right length and weight to suit the depth and current to which the instrument is to be lowered, the instrument being then lowered, the rotator assuming a direction facing against the current. As the rotator turns the make-and-break circle interrupts the electric current once for every rotation thereof, thereby making a record on board the ship or wherever the recording instrument may be located. If a sudden deflection should occur for any reason in the rotator, there will be probably no false record made thereby for the reason that the contact-spring $i^6$ is provided under absolutely constant contact with the make-and-break circle, and the weighted pendulum tends always to counteract any erratic movement of the instrument. If the current should be particularly low, it may be desired to lengthen the rudder, which may be done, as explained, by sliding the outer tube $o$ on the inner tube $o'$; also, in use with the pendulum at full length in deep water it will be found desirable to remove the horizontal plates $c'$ of the rudder. For use in rivers the meter may be clamped to the pendulum as low down as possible, when the horizontal plates may also be attached to steady it. As the water percolates within the oil-well $e^2$ and gradually reaches the electrical apparatus, thereby destroying the make-and-break capacity thereof, the instrument is raised to the surface and the water is removed from the opening $e^4$, the oil-well being again filled with oil. Owing to my invention, however, the frequency of this removal is greatly diminished, the instrument being capable of perfect working, even though a considerable amount of water should be contained therein.

Many changes in form, proportion, and arrangement of parts may be resorted to without departing from the spirit and scope of my invention.

Having fully described my invention, what I claim, and desire to secure by Letters Patent, is—

1. An electric-current meter, comprising a rotator, its shaft, bearings therefor and electrical make-and-break devices, combined with an oil-well for the latter, said make-and-break devices being mounted in the upper portion of said oil-well and the latter having an extended lower portion open freely below said make-and-break devices, substantially as described.

2. An electric-current meter, comprising a rotator, its shaft, bearings therefor and electrical make-and-break devices, combined with an oil-well for the latter, a portion of said make-and-break apparatus being mounted on said shaft and a portion on a cap secured removably to the upper end of said oil-well, substantially as described.

3. An electric-current meter, comprising a rotator, a shaft, make-and-break apparatus, an oil-well containing and supporting said make-and-break apparatus, a circuit-terminal, said terminal being held by means of a spring-plug secured in the top of said oil-well, substantially as described.

4. In an electric-current meter, a rotator and its shaft, combined with a vertically-elongated oil-well, electric make-and-break apparatus being mounted in the upper portion of said oil-well, a cap provided for the upper end of said oil-well supporting a portion of said apparatus, said cap containing a metal plug centrally perforated and radially split for a portion of its length to receive a circuit-terminal, and having one or more shoulders, an insulating-block surrounding said plug within said cap and engaging the shoulder or shoulders of said plug, and means to securely clamp said parts to the lower end of said cap, substantially as described.

5. In an electric-current meter, a rotator and its shaft, combined with a vertically-elongated oil-well, electric make-and-break apparatus being mounted in the upper portion of said oil-well, a cap provided for the upper end of said oil-well supporting a portion of said apparatus, said cap containing a metal plug centrally perforated and radially split for a portion of its length to receive a circuit-terminal, and having one or more shoulders, an insulating-block surrounding said plug within said cap and engaging the shoulder or shoulders of said plug, means to securely clamp said parts to the lower end of said cap, a gland within said cap above said parts, and means to compress said gland against said parts, substantially as described.

6. In an electric-current meter, a rotator, its shaft, said shaft having a conical tapered end, and having an end bearing for said shaft, said bearing comprising an end plate of iridium to receive said conical end and having an annulus to receive the adjacent portion of the shaft, one of the coöperating surfaces of said shaft and annulus being curved in cross-section, and the other of said surfaces being formed to contact therewith tangentially, thereby reducing the amount of frictional contact, substantially as described.

7. In an electric-current meter, a rotator, its shaft, said shaft having a conically-tapered end and a spheroidal portion adjacent said end, and a bearing therefor, said bearing comprising an end plate of hard non-corrosive material to receive said conical end, and an annulus to receive the contacting surface of said spheroidal portion, substantially as described.

8. In an electric-current meter, a rotator, its shaft, said shaft having a conically-tapered end, and a spheroidal portion adjacent said end, and a bearing therefor, said bearing comprising an end plate of hard non-corrosive material to receive said conical end, and an annulus to receive the contacting surface of said spheroidal portion, said bearing being removably mounted in the apparatus by means of a screw-socket, substantially as described.

9. In an electric-current meter, a rotator, its shaft, an oil-well, electric make-and-break apparatus supported in said well, an end bearing for said shaft mounted in the rear wall of said oil-well, an intermediate bearing for said shaft supported by a bracket projecting from the front wall of said oil-well, said oil-well being perforated to receive said shaft, and collars on said shaft, one collar being adjustable adjacent said intermediate bearing and the other collar being adjustable adjacent the perforation in the front wall of the oil-well, substantially as described.

10. In an electric-current meter, a rotator, its shaft, an oil-well, electric make-and-break apparatus supported in said well, an end bearing for said shaft mounted in the rear wall of said oil-well, an intermediate bearing for said shaft supported by a bracket projecting from the front wall of said oil-well, the latter being perforated to receive said shaft and collars on said shaft, one collar being adjustable adjacent said intermediate bearing and the other collar being adjustable adjacent said perforation in the front wall of the oil-well, the abutting surfaces of said perforation and said collar being annularly curved to fit one within the other, substantially as described.

11. A current-meter, comprising a rotator, a rudder, means connecting the same, and a support therefor, combined with an adjustable pendulum extension having a weight at its lower end and adapted to be secured to said apparatus for the purpose of steadying the same, and means for adjusting said extension up and down relatively to said apparatus, whereby accuracy of operation may be maintained in different currents and depths, substantially as described.

12. A current-meter, having a rotator, a rudder, means connecting the same, and a support therefor, means for adjusting said rudder toward and from said rotator, for the purpose of balancing the same, and means for rigidly securing the same in said adjusted position, substantially as described.

13. In a current-meter, a rudder comprising vertical plates and horizontal plates, said horizontal plates being removable, independently of said vertical plates, substantially as described.

14. In a current-meter, a rotator, a rudder, and connections between the same, said rudder being mounted telescopically on an extension from said intermediate connection, and means to fixedly adjust said rudder along said extension, substantially as described.

15. In an electric-current meter, a rotator, an electric make-and-break apparatus, adapted to record the rotations of said rotator, an electric terminal for said apparatus, and a bracket mounted rigidly and immovably on said meter and provided at its upper end with a clamp to receive said terminal and hold the same clamped immovable relatively to said meter, substantially as described.

16. In a current-meter, a rotator, its shaft, supporting-arms for said shaft, a rudder, and a connection between said arms and said rudder, said arms being pivotally mounted on said connection, substantially as described.

In testimony whereof I have signed my name to this specification in the presence of two subscribing witnesses.

CHRISTIAN L. BERGER.

Witnesses:
JOHN C. EDWARDS,
GEO. H. MAXWELL.